United States Patent

[11] 3,583,099

| [72] | Inventor | Samuel S. Fatu |
| | | Piscataway, N.J. |
| [21] | Appl. No. | 797,264 |
| [22] | Filed | Feb. 6, 1969 |
| [45] | Patented | June 8, 1971 |
| [73] | Assignee | Engelhard Minerals & Chemicals Corporation |
| | | Township of Woodbridge, N.J. |

[54] TILE FOR GERMINATING SEED AND MANUFACTURE THEREOF
6 Claims, No Drawings

[52] U.S. Cl. ......................................................... 47/56, 71/64, 47/37
[51] Int. Cl. .................................................. A01g 9/10
[50] Field of Search ............................................. 47/1, 9, 56, 57.6, 58; 71/64

[56] References Cited
UNITED STATES PATENTS

| 1,971,504 | 8/1934 | Pratt | 47/56 |
| 2,143,468 | 1/1939 | Avery | 47/1 |
| 2,243,857 | 6/1941 | Fischer | 47/9 |
| 2,579,733 | 12/1951 | Burgesser | 47/57.6 |
| 2,579,735 | 12/1951 | Burgesser | 47/57.6 |
| 2,785,969 | 3/1957 | Clawson | 71/64 |
| 2,971,292 | 2/1961 | Malecki | 47/58 |

FOREIGN PATENTS

| 641,280 | 8/1950 | Great Britain | 47/58 |

*Primary Examiner*—Robert E. Bagwill
*Attorney*—Melvin C. Flint

ABSTRACT: In accordance with the disclosure a mixture of particles of attapulgite clay, binder material, disintegrating agent and soluble plant nutrient is compressed to form a rigid platelike article. Seeds are included in the platelike member or they are secured to the surface. The plate is laid on earth and, after it has been wetted with water, it rapidly swells and disintegrates, eventually becoming part of the earth when the seeds germinate.

TILE FOR GERMINATING SEED AND MANUFACTURE THEREOF

BACKGROUND OF THE INVENTION

It has been suggested to incorporate seed in paper sheet material and then apply the sheet material to the ground in order to avoid spreading of seed by hand. This method of applying seed does not obviate the need to roll and level the earth before seeding and it does not provide means for fertilizing the seed. Moreover, this technique is generally limited in effectiveness to seeding small areas, such as a small flower patch or garden plot.

THE INVENTION

An object of the invention is to provide a rigid platelike article containing seeds, which article can be easily handled and laid on the ground and eliminates the need to roll and level the earth and then screen and spread the earth to cover the seed.

A further object is to provide an article of the nature described above which is characterized by being rigid when dry but which swells and disintegrates when wetted with water.

Another object is to provide an article of this nature which contains plant food nutrient material and thus provides a self-contained germination medium.

A further object is to produce the article largely from material which is obtained as a byproduct waste during the manufacture of certain clay absorbent products.

Stated briefly, the novel seed-planting article of the present invention is a rigid compressed mixture in the form of tiles or blocks and comprising particles of attapulgite clay (Georgia-Florida fullers earth), binder material to maintain the tiles in coherent form when dry, material which promotes the disintegration of the tile when wet, and seed either distributed in the tile or secured to a surface thereof. Preferably, the mixture includes a solid plant nutrient material.

The tile or block is characterized by being rigid and self-supporting when dry. When wet it disintegrates and the clay swells, forming a mushy, oatmeallike mass in which the seed tends to sink. With time the swollen disintegrated mass becomes part of the earth on which it was laid and the roots of the germinated seed become secured to the earth.

The major constituent of the tile is attapulgite clay. The clay may constitute from about 65 percent to 95 percent, preferably 80 percent to 95 percent, of the weight of the tile. When less than about 80 percent attapulgite is present, the tile may lack the water-binding properties and rigidity of tiles prepared with less clay. When more than about 95 percent clay is present, the tile may be friable.

In preparing the tiles, the clay may be used in the form of powder, small granules (e.g., minus 8 mesh granules) or a mixture thereof. A convenient source of powdered granular attapulgite clay is the byproduct fines obtained during the manufacture of adsorbent grades of attapulgite clay. Excellent results have been obtained with 20/40 mesh (Tyler) clay granules.

Preferably, a colloidal grade of attapulgite is used since tiles prepared with such clay have a spectrum of desirable properties. Colloidal grades of attapulgite clay are obtained by mildly drying attapulgite clay. In commercial practice a colloidal grade of attapulgite is obtained by extruding the raw clay to form pellets which have a convenient form for drying. The pellets are dried at a product temperature below about 300° F. and they are then pulverized and classified.

It is within the scope of the invention to use particles of heat-activated attapulgite clay, i.e., clay that has been dehydrated at temperatures up to about 1,000° F.

The binder should be a material which maintains the attapulgite particles in rigid coherent form when the tile is dry but which is sufficiently water-soluble or dispersible to permit disintegration of the tile when it is wet. Excellent results have been realized with sugar as the binder and using water in the molding mixture to dissolve the sugar. A wide variety of water-dispersible or soluble synthetic or natural polymers or gums may be used. Examples of such materials are tragacanth, acacia, starch paste and methyl cellulose.

A powdered compressant may be used to aid in molding the tiles by compression. Calcium phosphate is suitable although other conventional compressants may be used. A suggested proportion of compressant is within the range of about 1 percent to 10 percent of the weight of the tile or plate.

The use of powdered starch generally facilitates disintegration of the tiles when the tiles are watered. From about 2 percent to 15 percent starch (based on the tile weight) is suggested. Other disintegrants include cornstarch, alginic acid and microcrystalline cellulose.

Finely divided soluble fertilizer such as urea, potassium nitrate, sodium nitrate, or mixtures thereof may be incorporated. Slowly soluble fertilizer such as fritted fertilizer containing sources of available boron and trace elements may be present if desired.

To aid in mold release, the use of a small amount of a conventional lubricant such as stearic acid, aluminum stearate, calcium stearate or talc is recommended.

The tiles or blocks may be prepared by direct compression. The clay and other ingredients are mixed and water is added, if necessary, to provide a mixture capable of being molded by compression. During molding it is preferable to employ the minimum pressure required to produce a firm, coherent plate in order to provide a product that will disintegrate and swell rapidly when wet. When seed is present in the molding mixture, the use of moderate molding pressure minimizes possible seed damage.

The tiles or blocks may be formed by wet granulation techniques such as those used in the pharmaceutical industry.

Normally the tile will be provided in the form of flat plates which may be placed side-by-side to plant a lawn or field. However, it is within the scope of the invention to provide curved plates or strips that may be used, for example, to seed hills or embankments.

If desired seed may be coated on a preformed tile and secured on a surface thereof by any suitable adhesive. This may be accomplished by spraying the tile with a small amount of adhesive solution, such as a solution of urea-formaldehyde glue, sprinkling seed and drying.

The tiles may be provided in any suitable size and shape. Square or rectangular tiles 6 inches to 12 inches and about one-eighth inch to one-half inch thick are generally best suited for planting large areas such as lawn. Tiles of such size are light enough to handle and are packaged and shipped conveniently. The invention is not limited, however, to the use of a particular tile shape or size.

EXAMPLE

In accordance with this invention the following materials were thoroughly mixed in the order indicated:

|  | Parts by weight |
|---|---|
| Attapulgite clay [1] | 74.5 |
| Starch [2] | 5.0 |
| Sugar (cane) | 10.0 |
| Urea | 5.0 |
| Calcium diphosphate | 5.0 |
| Calcium stearate | 0.5 |
| Merion grass seed | 1.0 |
| Water | 25.0 |

[1] 20/40 mesh (Tyler) Attasorb® LVM, a colloidal grade of attapulgite clay.
[2] "Stayco M."

The mixture was placed in a Carver press and a pressure of 20,000 p.s.i. was applied, producing a rigid tile about one-eighth inch thick.

To test the effectiveness of the tile as a seed germination medium, one of the tiles was placed on New Jersey garden soil in an aluminum pan. Some of the same seed was planted in the soil in the other half of the pan and a metal plate was inserted in the pan to separate the two sections of soil. Both sides of the pan were watered daily.

With the first watering, the tile began to swell, then disintegrate. After this the seed in the tile began to sink in the mushy mass resulting from the swelling and disintegration of the tile. After 4 days, the seeds were not apparent. After 14 days, grass had germinated. After a month, the growth of grass in the section of the pan which originally contained the tile was virtually indistinguishable from the grass in the other section of the pan.

I claim:

1. As a new article of manufacture a dry, self-supporting, rigid platelike member adapted to be placed on soil for growing seed therein and comprising a compressed mixture of 65 percent to 95 percent by weight of particles of a colloidal grade of attapulgite clay, a disintegrating agent, a binder in amount sufficient to maintain the dry compressed mixture in coherent form, and seed distributed throughout said member, said platelike member possessing the property of swelling when wetted with water to form a mushy mass.

2. The article of claim 1 wherein said binder comprises sugar.

3. The article of claim 2 wherein said binder is sugar and said disintegrating agent is starch which is present in amount within the range of 2 percent to 15 percent by weight.

4. The article of claim 1 in which the mixture also contains finely divided particles of plant nutrient material.

5. The article of claim 1 in which the compressed mixture comprises from 80 percent to 95 percent by weight of a colloidal grade of attapulgite clay in the form of small granules, 2 percent to 15 percent by weight starch as the disintegrating agent, sugar in binder-effective proportion, and small amounts of each of calcium phosphate, calcium stearate and grass seed.

6. Dry rigid, coherent self-supporting tiles adapted to be placed on soil for planting seed thereon, said tiles being obtained by compressing a mixture of substantially the following composition:

| | Parts by weight |
|---|---|
| Colloidal attapulgite clay in the form of granules | 74.5 |
| Starch | 5.0 |
| Sugar | 10.0 |
| Urea | 5.0 |
| Calcium phosphate | 5.0 |
| Calcium stearate | 0.5 |
| Water | 25.0 |
| Seed | 1.0 |